United States Patent [19]
Gall

[11] Patent Number: 6,000,476
[45] Date of Patent: Dec. 14, 1999

[54] COMBINED ROCK PULLER AND LAND LEVELLER

[75] Inventor: Brian R. Gall, Southey, Canada

[73] Assignee: Ronald A. Carson, Saskatchewan, Canada

[21] Appl. No.: 08/837,384

[22] Filed: Apr. 17, 1997

[51] Int. Cl.⁶ .......................... A01B 49/02; A01B 63/10; A01B 63/22; A01B 63/32
[52] U.S. Cl. .......................... 172/196; 172/200; 172/407; 172/423; 172/684.5
[58] Field of Search .................................. 172/200, 199, 172/196, 140, 138, 795, 789, 783, 785, 779, 407, 423, 458, 468, 664, 668, 684.5

[56] References Cited

U.S. PATENT DOCUMENTS

| | | |
|---|---|---|
| 3,608,643 | 9/1971 | Flood et al. ..................... 172/200 X |
| 3,692,120 | 9/1972 | Cline ................................... 172/200 X |
| 4,898,247 | 2/1990 | Springfield ......................... 172/200 X |
| 5,407,015 | 4/1995 | Swords et al. ......................... 172/200 |

*Primary Examiner*—Christopher J. Novosad
*Attorney, Agent, or Firm*—Adrian D. Battison; Murray E. Thrift

[57] ABSTRACT

The present invention provides a combined rock puller and land leveler implement for alternatively pulling rocks from the ground or leveling the ground, and for pulling rocks from the ground and leveling the ground in one pass of the implement. The combined rock puller and land leveler comprises a frame having three individually articulated sections, a hitch attached to the front section, a rock pulling hook mounted on the front section behind the hitch, a land leveling blade mounted on the second section and ground wheels on a third section, and hydraulic cylinders for repositioning the frame sections into a plurality of positions.

5 Claims, 5 Drawing Sheets

006,000,476

COMBINED ROCK PULLER AND LAND LEVELLER

FIELD OF THE INVENTION

The present invention provides a combined rock puller and land leveler implement for alternatively pulling rocks from the ground or leveling the ground, and for pulling rocks from the ground and leveling the ground in one pass of the implement.

BACKGROUND

When removing large rocks and tree stumps from fields, particularly from farm fields, an individual usually employs a rock pulling implement. The rock pulling implement is positioned to engage the rock and is drawn out of the ground as the rock pulling implement is moved in a forwardly direction.

After removing the rock a hole is usually left in the surface of the ground which needs to be filled and leveled. To fill and level this hole the individual presently has to exchange the rock pulling implement for a land leveling implement. The land leveling implement is then positioned to engage the ground surface and is drawn across the ground and the hole thereby filling the hole and leveling the ground.

This technique is time consuming since equipment needs to be moved to and from the site, connected to the towing vehicle, and positioned for use. The need for two pieces of specialized equipment adds the additional problem of also making this technique expensive A combined rock puller and land leveler implement is needed which alternatively pulls rocks from the ground or levels the ground, and which can both pull rocks from the ground and level the ground in one pass of the implement.

SUMMARY

According to the present invention there is provided an implement comprising a combined rock puller and land leveler for pulling rocks from a ground surface and leveling a ground surface as the implement travels across the ground in a forward direction, said implement comprising;

an articulated frame articulated to hinge about an axis transverse to the direction of travel;

a rock pulling hook fixed to the articulated frame;

a land leveling blade fixed to the articulated frame and trailing the rock pulling hook;

and articulating means for repositioning the articulated frame into a plurality of positions.

According to a second aspect of the present invention there is provided an combined rock puller and land leveler comprising;

an articulated frame having:

hitch means arranged at a front end of the articulated frame for connecting to a towing vehicle;

wheel means arranged at a rear end of the articulated frame for supporting the articulated frame upon the ground;

a first frame section being fixed at a front end to the hitch means;

a second frame section being pivotally connected at a front end to a rear end of the first frame section;

a wheel support frame section being pivotally connected at a front end to a rear end of the second frame section and being fixed to the wheeled means at a rear end;

a rock pulling hook fixed to the first frame section of the articulated frame;

a land leveling blade fixed to the second frame section of the articulated frame;

and articulating means for repositioning the articulated frame into a plurality of positions, wherein the frame may be articulated into a first position for rock removal such that the rock pulling hook is positioned to engage a rock on the ground, and the land leveling blade is positioned above the ground, and wherein the frame may be articulated into a second position for land leveling such that the rock pulling hook is positioned above the ground, and the land leveling blade is positioned to engage the ground for leveling of said ground, and wherein the frame may be articulated into a third position for both pulling rocks from the ground and leveling the ground in one pass over said ground such that both the rock pulling hook and the land leveling blade are positioned to engage the ground, and wherein the frame may be articulated into a fourth position for transportation such that the rock pulling hook is positioned above the ground, and the land leveling blade is positioned above the ground.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
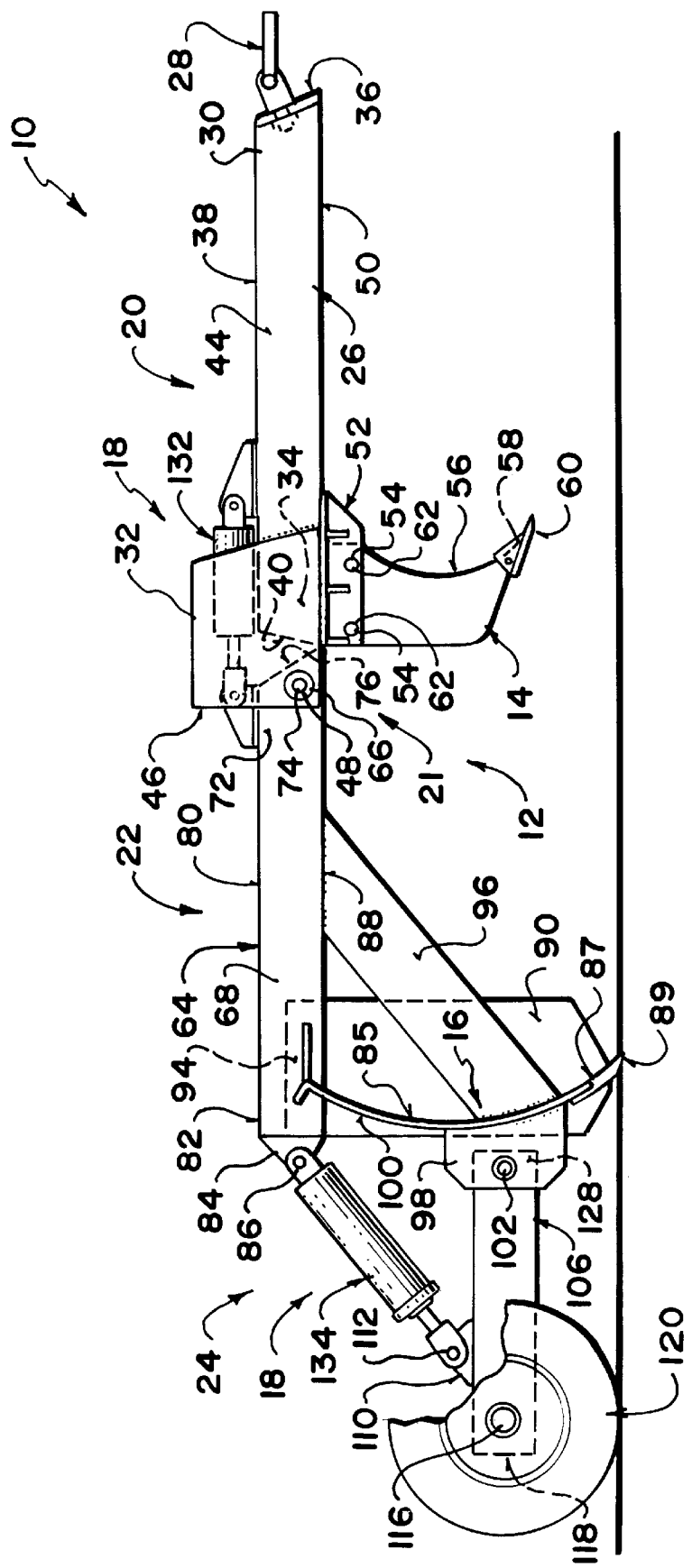
FIG. 1 a side view of the combined rock puller and land leveler.
Figure 2:
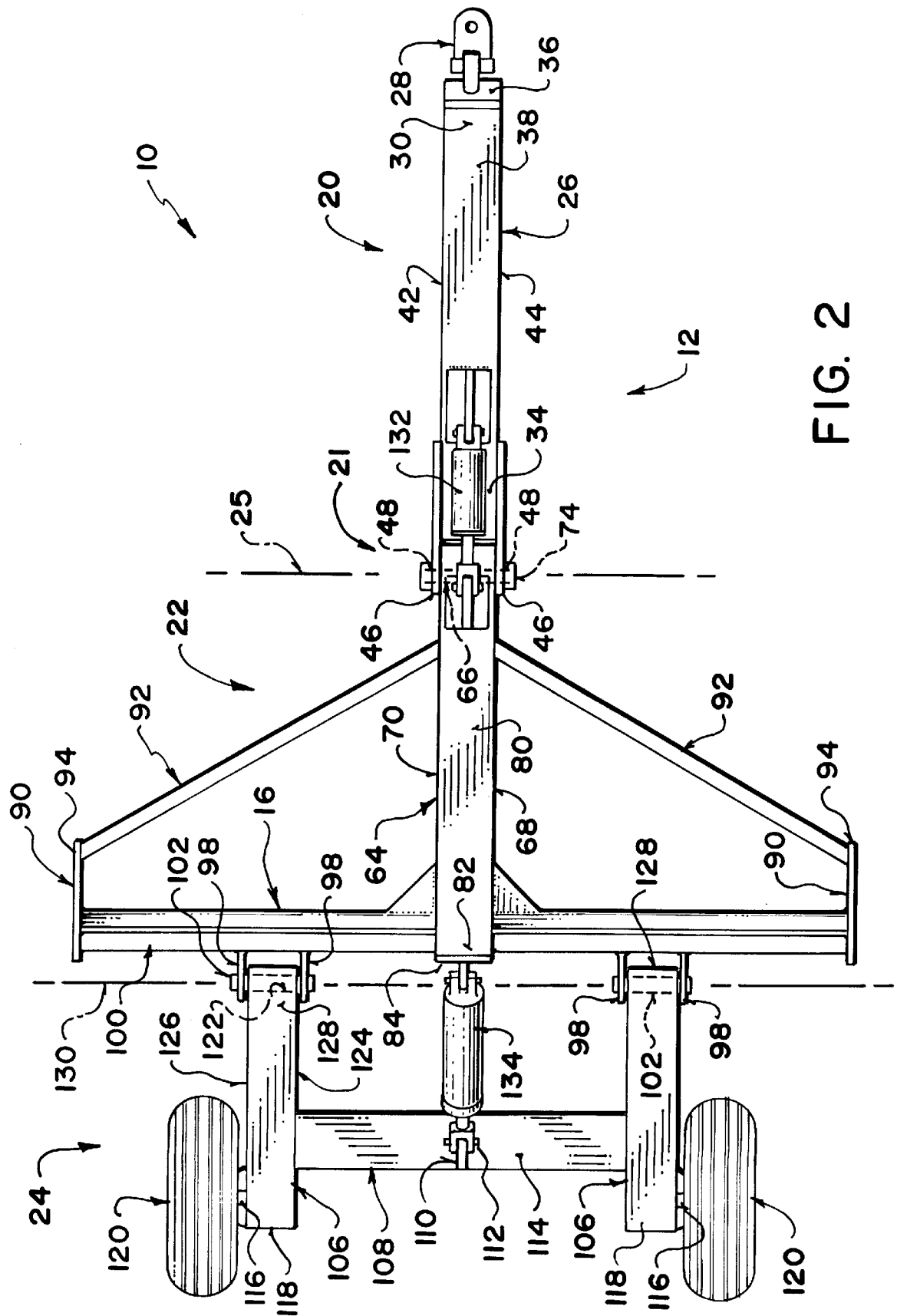
FIG. 2 a top view of the combined rock puller and land leveler.
Figure 3:
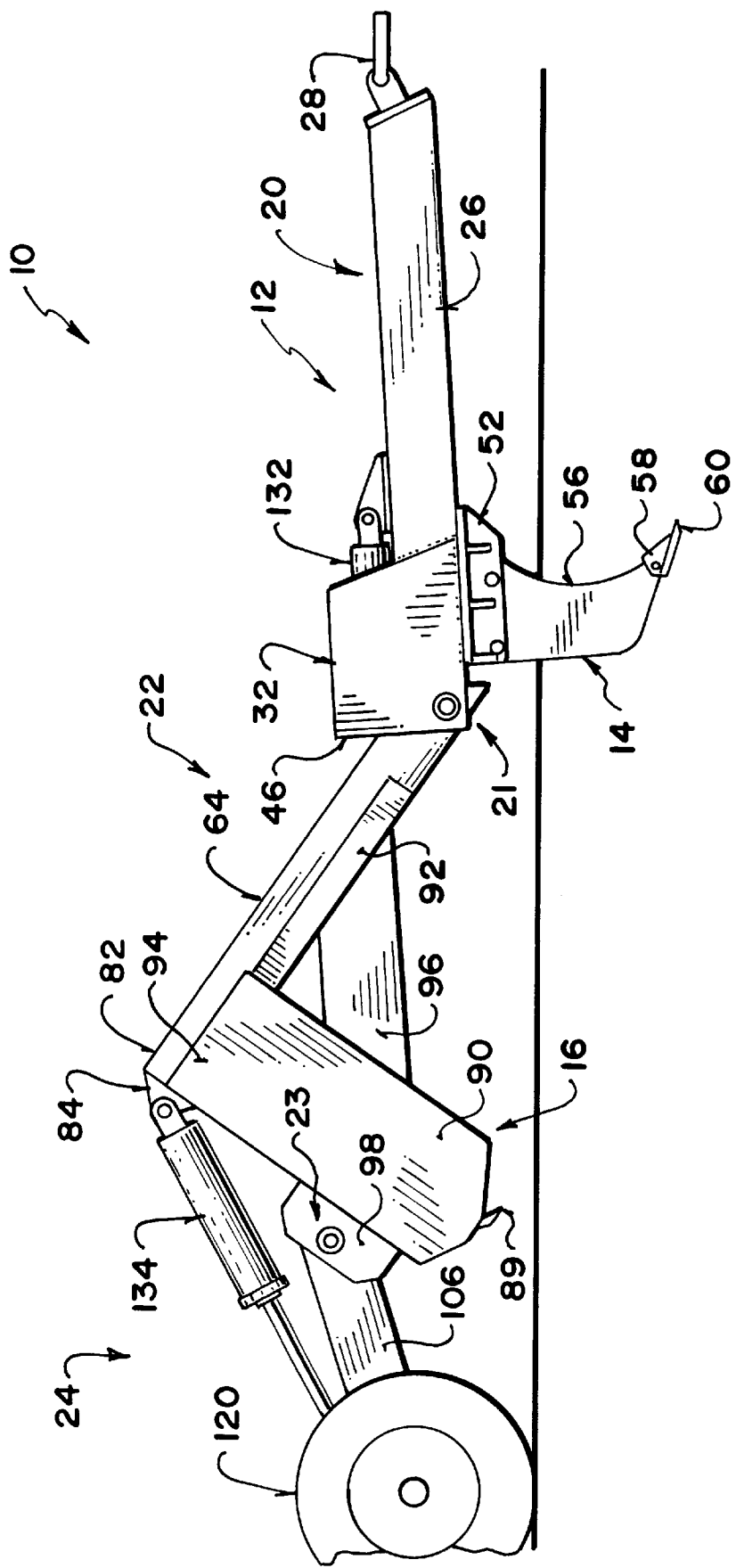
FIG. 3 a side view of the combined rock puller and land leveler in the rock pulling position.
Figure 4:
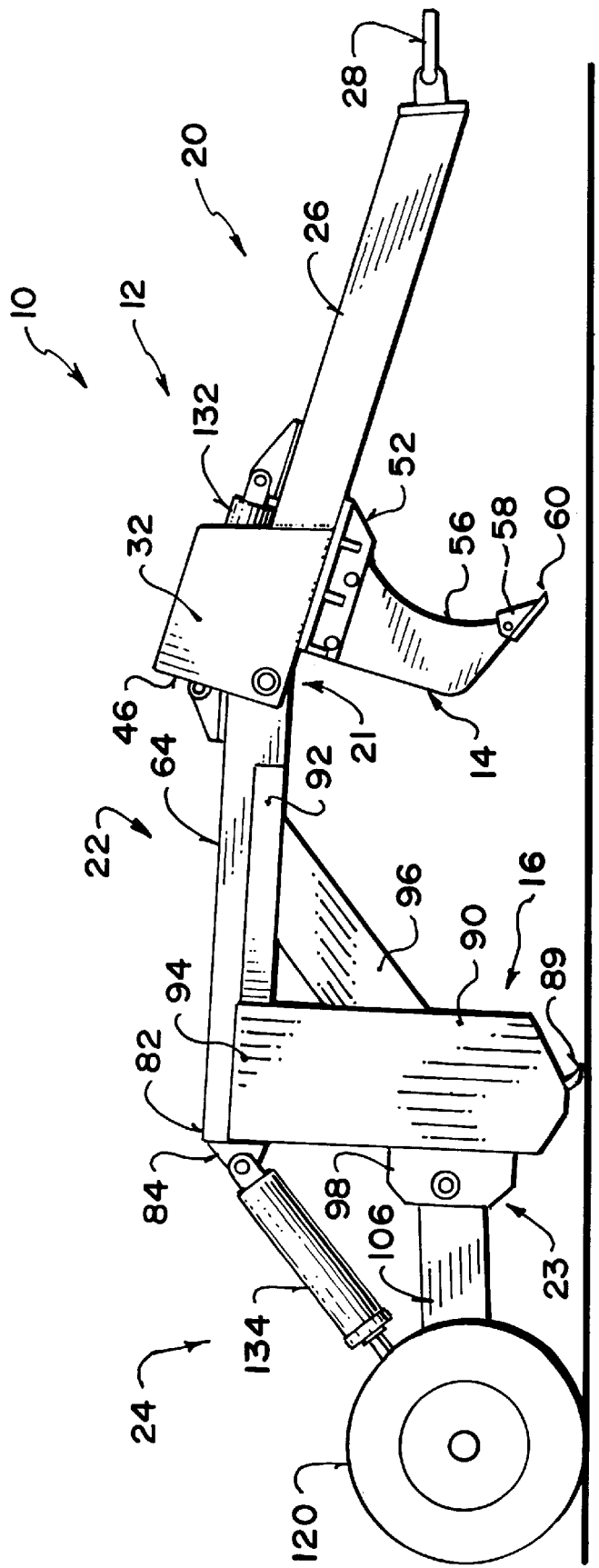
FIG. 4 a side view of the combined rock puller and land leveler in the land leveling position.
Figure 5:
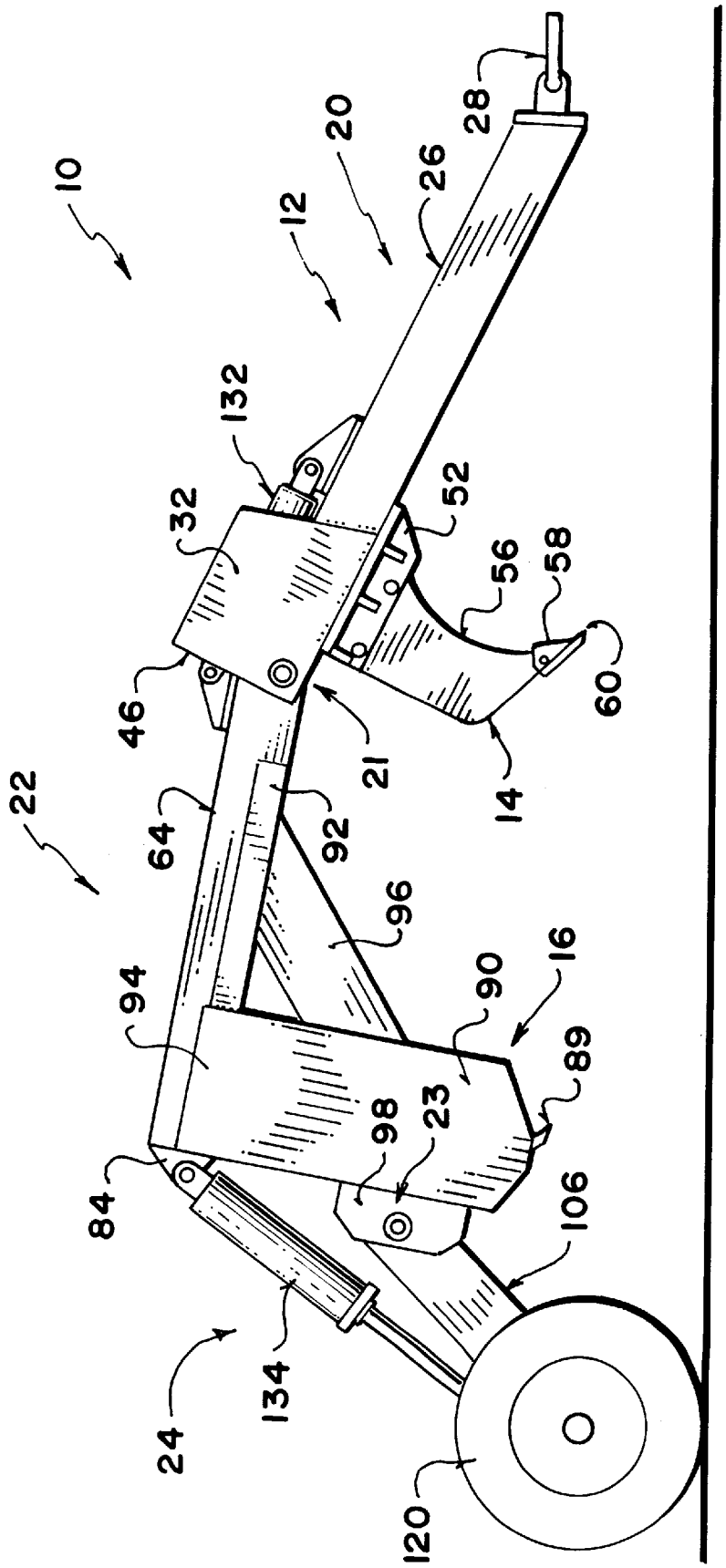
FIG. 5 a side view of the combined rock puller and land leveler in the traveling position.

Referring to FIGS. 1 and 2 the combined rock puller and land leveler implement is shown generally at 10. The combined rock puller and land leveler 10 can be used to pull rocks from the ground or level the ground surface as the implement travels across the ground in a forward direction. The combined rock puller and land leveler comprises an articulated frame 12, a rock pulling hook 14, a land leveling blade 16, and articulating means 18 for repositioning the articulated frame into a plurality of positions.

The articulated frame 12 comprises a first frame section 20, a second frame section 22, and a wheel support section 24. The first frame section 20 is arranged in front of the second frame section 22 and the wheel support frame section 24 is arranged to the rear of the second frame section 22. The articulated frame 12 is hinged about an axis 26 transverse to the direction of travel of the implement at the joint of the first and second frame sections 20 and 22 and the second frame section and the wheel support frame section 22 and 24.

The first frame section 20 comprises an elongate member and has a hitch fixed at a front end for connecting to a towing vehicle, and a pair of plate members at a rear end. The elongate member has a front face at the front end thereof. The front face slopes at an angle downwards and forwards from a top surface of the elongate member. The elongate member has a rear face at the rear end thereof. The rear face slopes at an angle downwards and rearwards from the top surface of the elongate member The hitch is fixed to the front face of the elongate member at the same angle as the front face and is arranged for connecting the implement to a towing vehicle.

The pair of parallel plates are fixed to opposing sides of the elongate member at the rear end thereof and extend rearwards from the elongate member to rear ends. The pair of parallel plates each have a hole located adjacent said rear ends, the holes are arranged such that the holes are aligned with one another.

On a bottom face of the elongate member is a pair of mounting flanges for the rock pulling hook. The mounting flanges are arranged longitudinally on the elongate member and are spaced apart to receive the rock pulling hook therebetween. Each mounting flange has a pair of holes spaced along its length. Each hole on one mounting flange is aligned with the corresponding hole on the other mounting flange for receiving bolt fasteners therethrough.

The rock pulling hook 14 is a downwardly projecting member having a concave shaped leading edge and a point at a bottom end projecting downwardly and forwardly for engaging the ground adjacent a rock. The point may have a hardened end such as a hoe tooth to prevent undue wear and to provide good ground penetrating capabilities. A pair of holes spaced to align with the holes in the mounting flanges are provided adjacent the top end of the downwardly projecting member. The rock pulling hook 14 is fixed between the mounting flanges by bolt fasteners extending through the aligned holes.

The second frame section 22 also comprises an elongate member aligned to follow the first frame section. The elongate member has a hole extending through opposing sides thereof located adjacent a front end. The hole in the second frame section aligns with the holes in the pair of parallel plates and a pin extends through the aligned holes thereby providing a pivot joining the first and second frame sections.

The elongate member of the second frame section also has a front face at the front end thereof. The front face slopes at an angle downwards and forwards from a top surface of the elongate member so that when the front of the second frame section is articulated downwards it does not bind with the rear face of the first frame section. This provides a pivot connection which pivots about an axis transverse to the direction of travel of the implement thereby allowing the first and second frame sections to hinge relative to one another about said axis. At a rear end of the elongate member a flange having a hole therethrough is fixed extending outwards and rearwards.

The land leveling blade is fixed to a bottom surface of the second frame section adjacent the rear end thereof. The land leveling blade extends laterally outwards to both sides of the second frame section and downwards from the bottom of the elongate member. The land leveling blade has concave front face curving forwards to a leading edge extending laterally along the bottom of the blade. The leading edge of the blade may have a hardened serrated scarifying blade, or the like, fixed to it to improve its performance.

The land leveling blade includes a support plate fixed at each of its sides arranged perpendicular to the blade to provide additional strength to the blade. A strut member extends from a top end of each of the support plates inwards to the elongate member to add rigidity to the blade. To provide further strength a second pair of strut members extend from a position near the center of the blade upwards to the bottom of the elongate member.

A pair of parallel plates are fixed on a back side of the land leveling blade towards each side thereof, and extending rearwards from the blade. Each one of the pair of parallel plates has a hole which is aligned with the hole on the plate opposite for receiving a pin member therethrough.

The wheel support frame section comprises a pair of spaced apart members being spaced outwards from and lying parallel to the first and second frame sections. A cross member extends between the two spaced apart members connecting them. A flange having a hole therethrough is fixed to a top surface of the cross member.

Each of the spaced apart members has a laterally outwardly extending axial fixed at a rear end for rotatably mounting a wheel. As well each of the spaced apart members has a hole extending through opposing sides thereof located adjacent a front end for aligning with the holes in a respective one of the parallel plates on the back of the land leveling blade. A pin extends through the aligned holes and has an axis transverse to the direction of travel of the implement thereby providing a pivot connection joining the wheel support and second frame sections. The pivot connection allows the second and wheel support frame sections to hinge relative to one another about the axis.

The articulating means for repositioning the articulated frame into a plurality of positions the articulating means comprises hydraulically actuated cylinders one being arranged at each of the respective pivot connections between the first and second frame sections and between the second and wheel support frame sections.

the land leveling blade is fixed to the second frame section of the articulated frame and trailing the rock pulling hook.

the articulating means includes means for raising and lowering the rock pulling hook relative to the ground.

the articulating means includes means for raising and lowering the ground leveling blade relative to the ground.

the frame may be articulated into a first position for rock removal such that the rock pulling hook is positioned to engage a rock on the ground, and the land leveling blade is positioned above the ground.

the frame may be articulated into a second position for land leveling such that the rock pulling hook is positioned above the ground, and the land leveling blade is positioned to engage the ground for leveling of said ground.

the frame may be articulated into a third position for transportation such that the rock pulling hook is positioned above the ground, and the land leveling blade is positioned above the ground.

the frame may be articulated into a fourth position for pulling a rock from the ground and then leveling the ground in one pass such that the rock pulling hook and the land leveling blade are positioned to engage the ground.

While one embodiment of the present invention has been described in the foregoing, it is to be understood that other embodiments are possible within the scope of the invention. The invention is to be considered limited solely by the scope of the appended claims.

I claim:

1. A ground working implement comprising;
    an articulated frame having:
        a first frame section fixed at a front end to a hitch for attachment to a towing vehicle;
        a second frame section pivotally connected at a front end to a rear end of the first frame section for pivotal movement about a first horizontal axis transverse to the direction of travel thereby allowing the first and second frame sections to hinge relative to one another about said first axis;
        and a wheel support frame section carrying ground wheels at a rear end and pivotally connected at a front end to a rear end of the second frame section for pivotal movement about a second horizontal axis transverse to the direction of travel thereby allowing the second frame section and the wheel support frame section to hinge relative to one another about said second axis;

a first actuating hydraulic cylinder for actuating pivotal movement of the first frame section relative to the second frame section;

a second actuating hydraulic cylinder for actuating pivotal movement of the second frame section relative to the wheel support frame section;

a rock pulling hook fixed to the first frame section of the articulated frame and extending downwardly therefrom for engagement with the ground;

and a land levelling blade fixed to the second frame section of the articulated frame and extending transversely thereacross for engaging the ground behind the hook.

2. The implement according to claim 1 wherein the first frame section comprises a single longitudinal main beam.

3. The implement according to claim 1 wherein the wheel support frame section comprises a pair of parallel rearwardly extending wheel support arms attached to and extending rearwardly from the land levelling blade and a cross member interconnecting the arms for common pivotal movement.

4. The implement according to claim 1 wherein the rock pulling hook consists of a single hook.

5. The implement according to claim 1 wherein the rock pulling hook is located centrally of the land levelling blade.

* * * * *